Oct. 14, 1958     W. H. PHELPS     2,855,744
FORAMINOUS GRASS CATCHER
Filed April 5, 1954     3 Sheets-Sheet 1
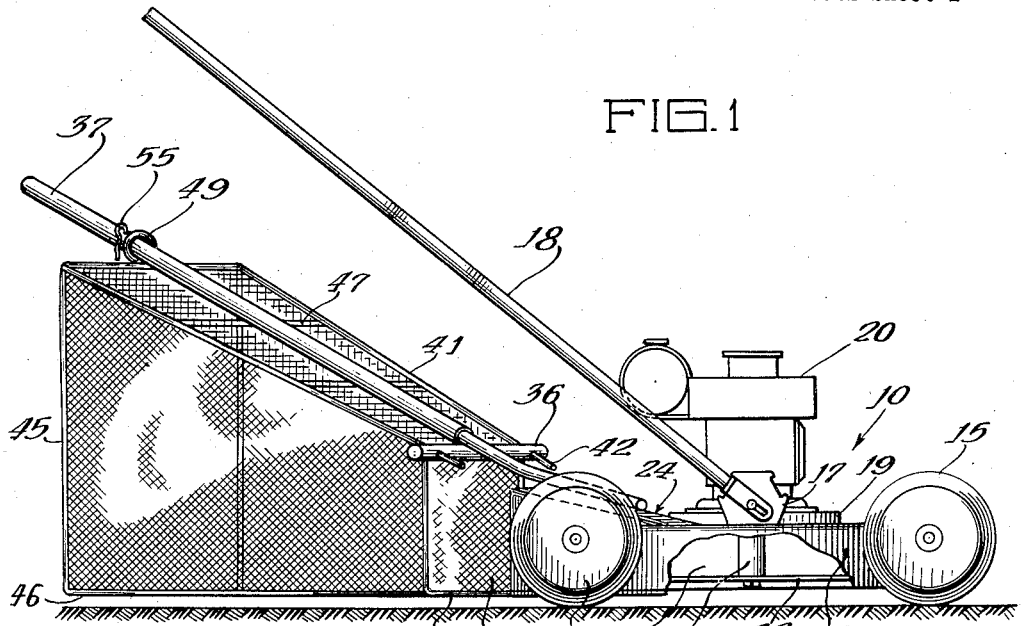
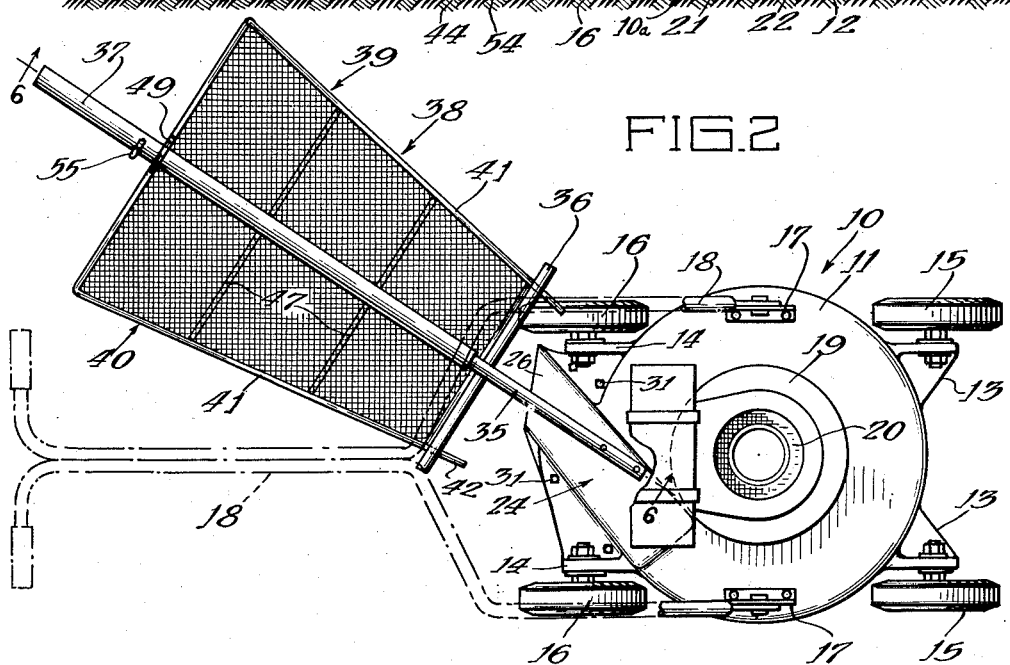
Inventor:
William H. Phelps
By: Schroeder, Hofgren,
Brady & Wegner
Attorneys

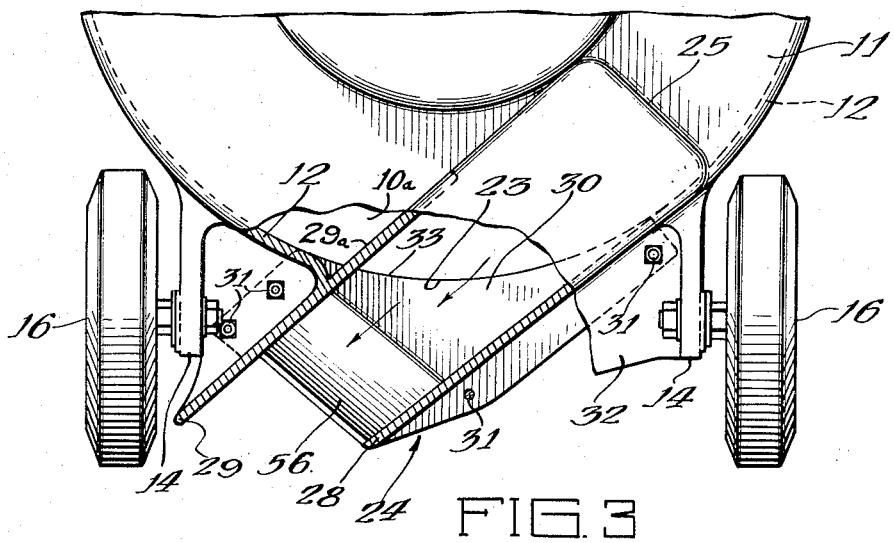

Oct. 14, 1958 W. H. PHELPS 2,855,744
FORAMINOUS GRASS CATCHER
Filed April 5, 1954 3 Sheets-Sheet 3
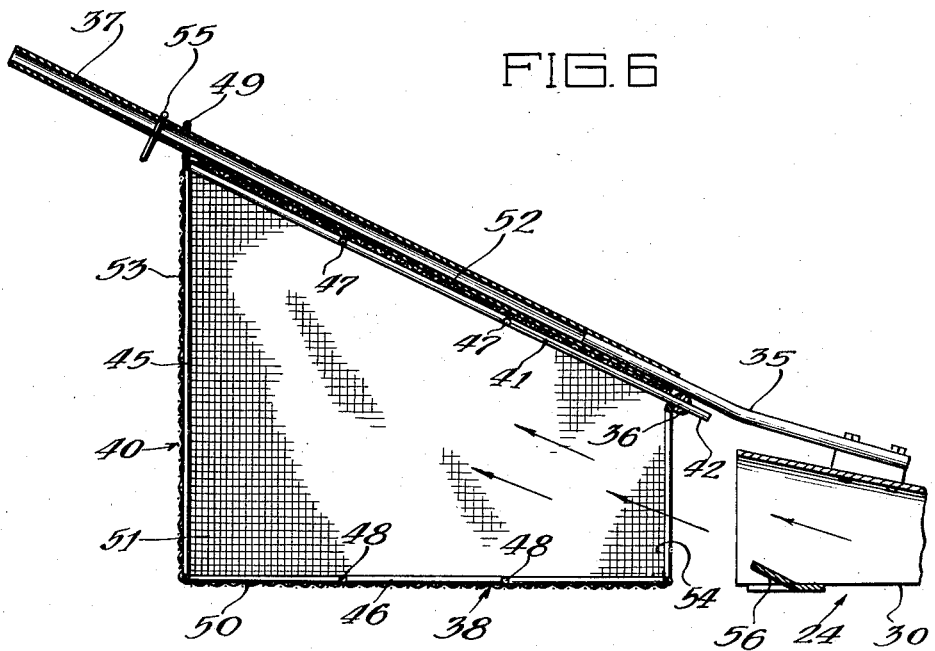
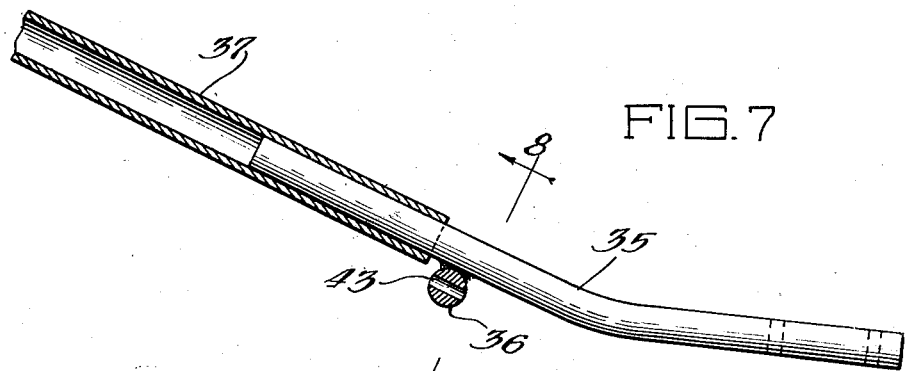
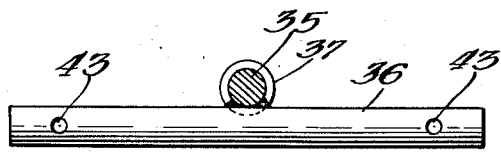
Inventor:
William H. Phelps
By Schroeder, Hofgren,
Brady & Wegner
Attorneys

United States Patent Office 2,855,744
Patented Oct. 14, 1958

2,855,744

FORAMINOUS GRASS CATCHER

William Howard Phelps, Ralston, Nebr.

Application April 5, 1954, Serial No. 420,855

3 Claims. (Cl. 56—202)

This invention relates to an improvement in rotary mowers, and in particular it relates to a clippings catcher the construction of which adapts it particularly to use with a rotary mower of the pressure discharge type.

One of the primary advantages of the rotary mower is that it does a finer job of mulching grass or weed clippings and lawn debris than is possible with reel type mowers as a result of which the resultant mulch often is so fine that it may be left on a lawn.

Under certain circumstances, however, it is desirable to catch the clippings in a basket rather than returning them to the lawn, and the present invention is concerned with an improved basket for receiving the clippings from a rotary mower.

Various types of rotary lawnmowers are becoming increasingly popular because of the fact that they will do a very fine mulching job, and if properly constructed will do a cutting job which is equal to or better than the best reel-type mowers for fine lawns. Quite a number of rotary mowers are now constructed so that the blade creates an updraft of air to carry the clippings into the housing above the blade and blow them out through an opening in the skirt which surrounds the tips of the blade. Such mowers will be referred to herein as "pressure discharge" mowers. Applicant has discovered that a pressure discharge mower requires a clippings basket having characteristics quite different from those which are necessary to receive the clippings from a reel-type mower in which the clippings are thrown into the basket by the mechanical action of the reel.

The principal object of the present invention, therefore, is to provide an improved clippings basket for a pressure discharge mower.

Applicant has discovered that a clippings basket for a pressure discharge mower should have upwardly diverging, substantially uniplanar sides, and should also have a uniplanar top which is inclined upwardly from its inner end toward its outer end. Since clippings are carried out of the mower housing in a blast of air, the walls of the basket must be of foraminous material, such as a fabric mesh, in order to permit the air to escape and pile the clippings up against the basket walls.

Furthermore, since most such mowers discharge the clippings in a relatively narrow stream which is projected a substantial distance outwardly from the mower housing, a basket may advantageously be made relatively narrow, and quite long as compared with baskets which are used on reel-type mowers.

Applicant has discovered that as the clippings pile up in the rear of a basket constructed as above described, the air tends to eddy back from the piled up clippings toward the discharge opening in the mower skirt, and the forwardly converging side walls and top provide for peripheral escape of the air currents, while the clippings carried in the air currents are caught on the converging walls and top so that they drop into the bottom of the basket.

The basket of the construction here disclosed may be so positioned with respect to the discharge opening for the mower that the clippings are directed into one rear corner of the basket; and as the clippings close off one part of the foraminous back wall, the air stream is automatically diverted to another portion of the rear of the basket, so that the stream of air and clippings moves back and forth across the basket and gradually piles the clippings further forward as the rear of the basket is filled. Applicant has discovered that a basket of the type here disclosed can receive and retain extraordinarily large quantities of clippings for its volume.

The invention is illustrated in a preferred embodiment in the accompanying drawings, in which:

Fig. 1 is a side elevational view of a mower embodying the invention with part of the skirt broken away;

Fig. 2 is a top plan view of the device shown in Figure 1 with part of the handle shown in broken lines for the sake of clarity;

Fig. 3 is a fragmentary top plan view on an enlarged scale with parts broken away and shown in section to show the interior of the clippings discharge spout;

Fig. 4 is a plan view of the bottom plate for the clippings discharge spout;

Fig. 5 is a fragmentary rear elevational view of the clippings discharge spout on a larger scale than Fig. 3;

Fig. 6 is a fragmentary longitudinal central section view of the rear portion of the clippings discharge spout and the clippings receiving basket, taken as indicated along the line 6-6 of Fig. 2;

Fig. 7 is an enlarged fragmentary sectional view of the supporting pole for the clippings basket; and Fig. 8 is a section taken as indicated along the line 8—8 of Fig. 7.

Referring to the drawings in greater detail, and referring first to Figs. 1–3, for exemplary purposes the basket of the present invention is shown on a power mower having a frame indicated generally at 10 which includes a generally planar circular horizontal top plate 11 and a peripheral depending skirt 12. The top plate 11 and skirt 12 provide an open bottom mowing and mulching chamber 10a. At opposite ends of the frame are integral wheel mounting arms 13 and 14 on which are mounted pairs of wheels 15 and 16, respectively. As seen in Fig. 2, the span across either of the pairs of wheels is less than the diameter of the skirt 12 so that the mowing chamber extends beyond the wheels on both sides.

Mounted on the top plate 11 and angle members 17 which provide brackets for a handle 18 which may be shifted so as to be inclined toward either end of the mower to permit the mower to be pushed in either direction. The handle mounting is described in detail and claimed in my co-pending application Serial No. 325,606 filed December 12, 1952 which issued September 18, 1956 as Patent Number 2,763,492.

At the center of the top plate 11 is a mounting boss 19 for a motor 20, which has a vertical shaft 21 at the lower end of which is a blade 22 which rotates in a horizontal plane adjacent the bottom of the skirt 12. The blade 22 is formed to provide a definite ascending and rotating air current within the mowing chamber 10a.

As best seen in Fig. 3, the skirt 12 has an opening 23 between the pairs of wheels 16 at one end of the machine, and a discharge hood, or spout, indicated generally at 24, extends outwardly from the opening 23 in the skirt. The spout 24 is formed integrally with the frame 10, and its inner margin 25 lies along a radius of the frame with the top wall on plate 26 of the spout inclined upwardly from the frame 10 toward the outer end 27 of the spout. The upright outer wall 28 of the spout forms a tangential projection of the circular skirt 12 which extends laterally and longitudinally beyond the frame 10, between the wheels 16; while a second, or inner wall 29 of the spout is parallel to the outer wall 28 and extends outwardly along a plane which is a projection of a chord of the circle formed by the skirt 12. The wall 29 terminates at the skirt 12 but for a strengthening brace 29a which has an inclined lower margin extending from near the base of skirt 12 upwardly and inwardly to form a triangular baffle which terminates substantially in line with the junction of wheel brackets 14 and skirt 12.

In order to keep clippings in the air blast as they pass through the spout 24, a bottom plate 30 is fastened by means of bolts 31 to the underside of a web 32 which extends between the wheel mounting brackets 14, the plate having an arcuate inner margin 33 which conforms to the curvature of the skirt 12. Thus, the plate 30, in cooperation with the side walls 28 and 29 and the top wall on plate 26 of the discharge spout 24 defines a closed passage designated in the drawings by the numeral 34.

The structure disclosed up to this point does not differ from that heretofore disclosed and claimed in my application Serial No. 375,385 filed August 20, 1953, now abandoned in favor of a continuation-in-part, Serial No. 461,097, filed October 8, 1954.

As best seen in Figs. 7 and 8, an inclined supporting stub 35 which is secured to the top 26 of the discharge spout 24 extends longitudinally and laterally outwardly from the frame 10, and has a cross bar 36 welded in a position which is spaced slightly outwardly from the outer end of the spout 24. An elongated hollow supporting pole 37 has its inner end slidably engaging the outer portion of the pole stub 35 so that the pole forms an elongation of the stub. As best seen in Fig. 2, the hollow supporting pole 37 is substantially to one side of the handle 18 when the handle is at the spout end of the machine.

A long, relatively narrow clippings receiving basket, indicated generally at 38, which has a rigid frame indicated generally at 39 and a foraminous body indicated generally at 40, is suspended on the supporting pole 35 entirely to one side of a person pushing the mower when the handle 18 is at the spout end of the machine. As best seen in Figs. 2 and 6, the basket 38 has a pair of outwardly inclined longitudinal top frame members 41 which define the upper side edges of the basket and have supporting extension stubs 42 which project forwardly so as to engage holes 43 in the cross bar 36. Referring particularly to Figs. 1 and 2, the basket frame 39 also includes a rectangular inner frame member 44 which has its upper corners joined to the top longitudinal frame members 41, a rectangular outer frame member 45 which has its upper corners joined to the outer ends of the top longitudinal frame members 41, a pair of bottom longitudinal frame members 46 which have their ends secured to the inner frame member 44 and outer frame member 45, and intermediate top spreader bars 47 and bottom spreader bars 48 which hold the longitudinal frame members in proper position between the front and rear rectangular frames 44 and 45.

A mounting ring 49 on the top of the rear rectangular frame 45 slides onto the support pole 37 to support the outer end of the basket 38.

The foraminous body 40 of the basket includes a bottom wall 50, side walls 51, a top wall 52 and an outer wall 53, so that the basket is enclosed by the foraminous body 40 except at its inner end, or mouth 54. As best seen in Fig. 6, the mouth 54 of the basket is spaced rearwardly a short distance from the outer, or discharge end of the clippings spout 24. The supporting pole 37 is apertured adjacent its outer end to receive a spring clip 55 which limits movement of the basket 38 on the pole to prevent disengagement of the supporting fingers 42 from the cross bar 36.

It is clear from the foregoing description of the basket construction that the entire supporting pole 37 and basket 38 are wholly supported by the frame 10, and may be removed from the mower as a unit by sliding the pole 37 off of the stub 35 which simultaneously disengages the supporting fingers 42 from the cross bar 36.

Adjacent the outer end of the clippings spout 24 the bottom plate 30 is provided with an upwardly inclined lip 56 (see Fig. 6) which deflects the clippings laden air stream from the spout upwardly so that the air blast carries the clippings clear to the outer wall 53 of the basket.

As best seen in Figs. 2 and 6, the basket side walls are uniplanar and diverge toward the outer end of the basket, and the top and bottom walls also are uniplanar and diverge outwardly. The divergence is generally similar to the expansion of the dimensions of the stream of air and clippings as it gets farther from the spout.

The space which is left between the outer end of the spout 24 and the mouth 54 of the basket permits the air blast from the spout to draw in secondary air around the entire periphery of the spout and the inner end of the basket so as to prevent any currents which might otherwise throw clippings laterally out of the mouth of the basket. The blast of air from the spout is strong enough to throw the clippings forcibly against the outer wall of the basket, and as seen in Fig. 2, the relationship of the basket and spout is such that the initial loading of clippings is in one corner of the rear of the basket. As the clippings pile up in that corner they stop the free movement of air outwardly through the foraminous outer wall 53 of the basket which automatically diverts the stream of clippings to another portion of the basket, producing very even loading of the basket. Furthermore, since the inclined deflector 56 at the rear of the clippings spout 24 projects the stream of air and clippings upwardly so that it goes clear to the outer wall of the basket, loading of the basket is strictly from the outer end toward the inner end, and there is no tendency of clippings to pile up in the basket mouth and cause incomplete loading of the basket.

The foregoing detailed description is given for clearness of understanding only and no unnecessary limitations are to be understood therefrom, as some modifications will be obvious to those skilled in the art.

I claim:

1. A clippings basket for use with a rotary power mower of the pressure discharge type, said basket comprising: a basket frame of generally rectangular cross section, said frame having substantially uniplanar, outwardly diverging sides, a generally horizontal flat bottom, and a uniplanar top which is inclined upwardly and outwardly, said sides, top and bottom defining inner and outer ends of said frame; a foraminous basket body enclosing all but the inner end of the frame; and attaching means on the basket frame for detachably supporting said basket.

2. A clippings basket for use with a rotary power mower of the pressure discharge type, said basket comprising: a rigid basket frame including an inner frame member defining the perimeter of the inner end of the frame, an outer frame member defining the perimeter of the outer end of the frame, the area enclosed by said outer frame member being of similar shape but larger than the area enclosed by the inner frame member, straight longitudinal bottom frame rods perpendicular to, and connecting the lower portions of said inner and outer frame members, and straight longitudinal upper frame bars connecting the upper portions of said frame members, whereby the sides and top of said frame converge from its outer end straight toward its inner end; a foraminous basket body secured to the frame and enclosing all but the inner end thereof; and means on the basket frame for detachably supporting the basket.

3. A clippings basket for use with a rotary power mower of the pressure discharge type, said basket comprising: a basket frame of generally rectangular cross section, said frame having substantially uniplanar, outwardly diverging sides, a generally horizontal flat bottom, and a uniplanar top which is inclined upwardly and outwardly, said sides, top and bottom defining inner and outer ends of said frame, and the distance from said inner end to said outer end being substantially greater than the width of said outer end; a foraminous basket body enclosing all but the inner end of the frame; and attaching means on the basket frame for detachably supporting said basket.

References Cited in the file of this patent

UNITED STATES PATENTS

| | | |
|---|---|---|
| 459,460 | Powell | Sept. 15, 1891 |
| 661,081 | Sellstrom | Nov. 6, 1900 |
| 869,349 | Coult | Oct. 29, 1907 |
| 952,308 | Clemens, Jr. | Mar. 15, 1910 |
| 986,883 | Wessel, Jr. | Mar. 14, 1911 |
| 1,484,084 | Rohrbach | Feb. 19, 1924 |
| 1,805,927 | Sharp | May 19, 1931 |
| 1,899,564 | Frey | Feb. 28, 1933 |
| 2,071,872 | Cockburn | Feb. 23, 1937 |
| 2,641,100 | Sylvester | June 9, 1953 |
| 2,675,661 | Tilzer | Apr. 20, 1954 |
| 2,737,003 | Beers | Mar. 6, 1956 |